United States Patent Office 2,801,908
Patented Aug. 6, 1957

2,801,908

SUBSTITUTED 2,5-DIAMINO-3-CYANOTHIOPHENES AND THEIR PREPARATION

William J. Middleton, Wilmington, Del., assignor to E. I. du Pont de Nemours and Company, Wilmington, Del., a corporation of Delaware No Drawing. Application March 10, 1955,
Serial No. 493,551

15 Claims. (Cl. 260—332.2)

This invention relates to new substituted thiophenes and to their preparation. More particularly this invention relates to new substituted thiophenes which have both cyano and amino groups attached to the thiophene nucleus.

Thiophene is a five-membered sulfur-containing heterocyclic compound which contains two nuclear carbon-to-carbon unsaturations. The compound has rather unexpected properties in that it and its unsaturation resemble that of benzenoid compounds in many respects. Although thiophene compounds have interesting properties, little use has been made of thiophene-containing compounds. Furthermore, the amino-containing thiophene compounds heretofore available are indicated to be very unstable (see German Patent 257,462).

It is an object of this invention to provide new substituted thiophenes and processes for their preparation. A further object is to provide new substituted thiophenes containing both cyano and amino groups attached to the thiophene nucleus. A still further object is to provide useful products which are derivatives of polycyanoethylene or polycyanoethane. Other objects will appear hereinafter.

These and other objects of this invention are obtained by providing substituted thiophenes in which each of the nuclear carbon atoms bonded to nuclear sulfur bears an amino group and one of the other nuclear carbon atoms bears a cyano group and the remaining nuclear carbon atom bears a group which is directly bonded thereto by carbon which is further bonded solely to from one to two elements of atomic number 6 to 8 and is multiply bonded to one of these elements. The new cyano-containing diaminothiophenes (2,5-diamino-3-cyanothiophenes) of this invention have the general structural formula

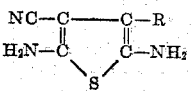

where R is a group which is directly and singly bonded to nuclear carbon of the thiophene ring by a carbon atom which is further bonded solely to from one to two elements of atomic number 6 to 8, i. e., to carbon, nitrogen or oxygen, and is multiply bonded to one of these elements. This carbon atom which is singly bonded to nuclear carbon of the thiophene ring and is further multiply bonded to carbon, nitrogen or oxygen does not have hydrogen directly attached to it. Radical R thus includes cyano, —C≡N; phenyl, —C₆H₅; carbalkoxy, —COO alkyl; keto or acyl,

and carbamyl, —CONH₂ groups. The preferred compounds are those in which R contains 1 to 6 carbon atoms. Compounds within the scope of this invention include 2,5-diamino-3,4-dicyanothiophene, 2,5-diamino-3-cyano-4-phenylthiophene, 2,5-diamino-3-cyano-4-carbethoxythiophene, 2,5-diamino-3-cyano-4-carbamylthiophene, and 2,5-diamino-3-cyano-4-acetylthiophene. These new compounds, although generally stable, possess a high degree of activity as photographic developers.

The new substituted thiophenes of this invention are obtained by reacting a water-soluble inorganic sulfide under basic conditions with a polycyano compound of the formula (NC)₂CHCH(CN)R, i. e., a polycyanoethane or (NC)₂C=C(CN)R, i. e., a polycyanoethylene, wherein R is a radical which is directly and singly bonded to chain carbon of the polycyano compound by a carbon atom which is further bonded solely to from one to two elements of atomic number 6 to 8 inclusive and is multiply bonded to one of these elements. The radical R in these formulas include cyano, phenyl, carbalkoxy, keto or acyl and carbonamide groups. The preferred compounds are those in which R is up to 6 carbon atoms and includes —C≡N, —COO(CH₂)₁₋₅H

—C₆H₅ and —CONH₂. The compounds that can be employed in this reaction, in addition to tetracyanoethylene and tetracyanoethane, include tricyanoethanes, such as 1-phenyl-1,2,2-tricyanoethane.

Although thiophene requires high temperature reactions for its preparation, the new substituted thiophenes of this invention are readily obtained by the reaction of either a polycyanoethylene or a polycyanoethane, such as for example tetracyanoethylene or tetracyanoethane, with an inorganic sulfide, such as hydrogen sulfide, under basic conditions at low temperatures.

The following examples, in which the parts are by weight, illustrate the preparation of the new thiophenes.

EXAMPLE I

*2,5-diamino-3,4-dicyanothiophene reaction of tetracyanoethane with sodium sulfide*

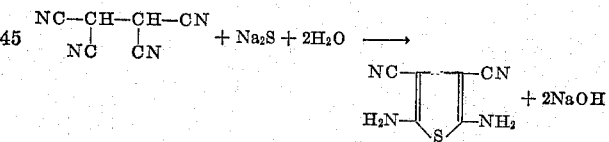

A cooled solution of 12.0 parts of sodium sulfide decahydrate in 100 parts of water was mixed rapidly with a solution of 6.5 parts of tetracyanoethane in 24 parts of acetone. The solution immediately became light orange in color and a pink precipitate began to form. The precipitate was collected on a filter, washed with water, and dried. The material was dissolved in dimethylformamide, treated with decolorizing charcoal, filtered and after addition of water, light pink needles separated. There was obtained 2.0 parts of 2,5-diamino-3,4-dicyanothiophene which sublimed at 240–244° with some decomposition.

*Analysis.*—Calcd. for C₆H₄N₄S: C, 43.90; H, 2.46; N, 34.13; S, 19.53; M. W., 164.18. Found: C, 44.11, 44.24; H, 2.54, 2.69; N, 34.09, 34.21; S, 19.48; M. W., 159, 172.

There were bands at 2.95, 3.02, and 3.1μ for NH₂ and a band at 4.53μ for conjugated CN in the infrared absorption spectra.

The absence of a mercapto group was shown by the fact that a solution of the compound (2,5-diamino-3,4-dicyanothiophene) in dimethylformamide did not decolorize a dilute iodine solution.

EXAMPLE II

*2,5-diamino-3,4-dicyanothiophene reaction of tetracyanoethane with hydrogen sulfide*

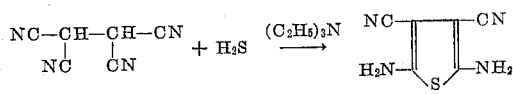

2,5-diamino-3,4-dicyanothiophene was also prepared by the general procedure of Example I except that a solution of hydrogen sulfide and triethylamine in acetone was employed in place of the sodium sulfide. The product had substantially the same infrared and analytical values as recorded in Example I.

EXAMPLE III

*2,5-diamino-3,4-dicyanothiophene reaction of tetracyanoethylene with hydrogen sulfide*

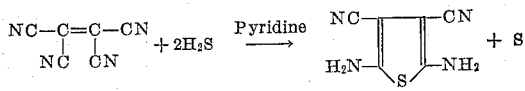

A solution of 12.8 parts of tetracyanoethylene in 120 parts of acetone and 190 parts of carbon disulfide was saturated with hydrogen sulfide gas. The cloudy solution was cooled in an ice bath, and 50 parts of pyridine was added slowly. The solution became clear. It was again saturated with hydrogen sulfide. A yellow precipitate formed. The precipitate was collected on a filter, washed with acetone, and dried. There was obtained 15.1 parts (92% yield) of 2,5-diamino-3,4-dicyanothiophene in the form of a yellow crystalline powder. This material was recrystallized from dimethylformamide-water (75:25) to give 9.0 parts of light tan needles.

*Analysis.*—Calcd. for $C_6H_4N_4S$: N, 34.13; S, 19.53. Found: N, 34.06, 34.22; S, 19.37.

EXAMPLE IV

*2,5-diamino-3-cyano-4-phenylthiophene reaction of phenyl-1,1,2-tricyanoethane with hydrogen sulfide*

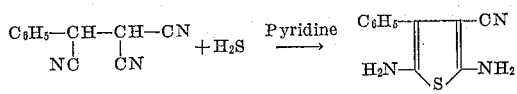

To 20 parts of pyridine saturated with hydrogen sulfide was added rapidly 5 parts of tricyanoethylbenzene, i. e., phenyl-1,1,2-tricyanoethane (obtained by the general procedure of Corson and Stoughton, J. Am. Chem. Soc. 50, 2825 (1928)). Hydrogen sulfide gas was bubbled through this solution for an additional eight minutes while the temperature of the solution was held below 55° C. by intermittent cooling. The solution was poured onto ice, the aqueous solution extracted with ether and the combined ether extracts dried over anhydrous magnesium sulfate. Evaporation of most of the solvent on the steam bath and addition of carbon tetrachloride to the residue produced 3.78 parts (63.6%) of 2,5-diamino-3-cyano-4-phenylthiophene, a pale green solid, M. P. 84–99° C. (with previous softening). An alcoholic solution of the compound failed to decolorize an aqueous 0.1 N iodine solution indicating the absence of a free mercaptan group.

After several recrystallizations from benzene and chromatographic purification on a purified fuller's earth column, a blue-gray solid was obtained, M. P. 100–105° (dec.), λ max. in $CHCl_3$ 300 mμ (ε 5790), 560 mμ (ε 58).

*Analysis.*—Calcd. for $C_{11}H_9N_3S$: C, 61.37; H, 4.21; N, 19.52; S, 14.89; M. W., 215. Found: C, 62.18, 62.05; H, 4.66, 4.54; N, 18.90, 19.23; S, 14.51; M. W., 235, 230.

The infrared spectrum indicated the presence of a conjugated nitrile group. Repetition of the above procedure as rapidly as possible with less time for air oxidation gave a cleaner product.

2,5-diamino-3-cyanothiophene having an iminoether hydrochloride group in the 4-position is obtained by the treatment of 2,5-diamino-3,4-dicyanothiophene with hydrogen chloride in anhydrous ethanol. The corresponding ethyl ester is obtained by hydrolysis, i. e., by reaction of the iminoether hydrochloride with water. The carbonamide (2,5-diamino-3-cyano-4-carbamylthiophene) results from treatment of the ester with ammonia.

The tetracyanoethylene in Example III was prepared as disclosed in Cairns and Graef U. S. patent application Serial No. 382,842, filed September 28, 1953, by reaction of sulfur monochloride with malononitrile as in the following procedure:

Sulfur monochloride (70 parts) was added slowly during the course of six hours to a refluxing solution of 33 parts of malononitrile in about 600 parts of chloroform. After the mixture refluxed for an additional 20 hours, the chloroform was removed by heating on a steam bath. The crystalline residue was extracted with diethyl ether in a Soxhlet extractor. Evaporation of the ether extract gave crude tetracyanoethylene which was further purified by sublimation at 100° C. under a pressure of 1–2 mm.

The tetracyanoethane, employed in Examples I and II, was obtained as disclosed in Heckert U. S. patent application Serial No. 421,997, filed April 8, 1954, by reduction of tetracyanoethylene, e. g., a solution of 19.2 parts of tetracyanoethylene in about 60 parts of acetone was cooled in an ice bath and about 30 parts of mercaptoacetic acid added. The white needles obtained were recrystallized from acetone/water solution.

The new substituted thiophenes of this invention have two amino groups on the nuclear carbons bonded to the sulfur and attached to the remaining nuclear carbons a cyano group and a group bonded directly to nuclear carbon by carbon which is multiply bonded to an element of atomic number 6 to 8, i. e., the remaining valences are satisfied by bonding to one to two atoms of atomic number 6 to 8. The preferred new compound of this invention, 2,5-diamino-3,4-dicyanothiophene, is obtained by the reaction of an inorganic sulfide, and preferably hydrogen sulfide, with tetracyanoethane or tetracyanoethylene under basic conditions. The inorganic sulfide is one which is soluble under the reaction conditions, preferably hydrogen sulfide or the alkali metal sulfides.

Suitable bases for the catalysts of the reaction are those which are soluble in the reaction media and in water give a pH of 8 or above. These include the alkali metal hydroxides and carbonates, e. g., potassium hydroxide or potassium carbonate, as well as basic amines, particularly the tertiary amines such as trialkyl or trialkanol amines, including pyridine and triethanolamine. When an alkali metal sulfide is employed, the alkali metal compound is itself sufficiently basic under the reaction conditions to serve both as reactant and catalyst.

Since the catalyst is not directly involved in the reaction product, it is not essential that it be present in large amounts. In general, the base is present in amounts of from 1 to 100% or more of the tetracyano compound employed. Sufficient base is present to insure that the reaction is effected under non-acidic conditions.

The sulfide is employed in amounts which on a molar basis are greater than that of the polycyanoethane or polycyanoethylene, such as tetracyanoethane or tetracyanoethylene. The sulfide is one that is soluble under the reaction conditions. When a polycyanoethylene, such as tetracyanoethylene, is used as a reactant, it is probably reduced by sulfide or thiol groups to the corresponding ethane which then reacts. Accordingly, when tetracyanoethylene is employed as a starting material instead of tetracyanoethane, more sulfide is required in the reaction. Generally the sulfide is present in molar ratios at least as high as that of the polycyano compound and generally 2 to 10 times or more greater than the polycyano compound.

The reaction takes place at room temperatures although temperatures of below 0° C. to as high as 60° C. can be used. Temperatures of above 60° C. are not preferred since, in the presence of base, the yield of thiophene is decreased. The time required is generally quite short, e. g., a few minutes, although times of the order of a few hours or longer can be used.

Non-reactive solvents are useful to dissolve the polycyano compound. The solvents are those which will dissolve the reactants to form a homogeneous solution as well as dissolve any added basic catalyst. It is sometimes advantageous to use water-soluble solvents since isolation of the water-insoluble new thiophene compound produced can be brought about by dilution of the reaction mixture with water and separation from the inorganic and water-soluble compounds. Useful solvents include acetone, dimethylformamide, and tetrahydrofuran. When an amine is employed as the basic catalyst, it can also serve as the solvent. An acetone-carbon disulfide mixture is useful as a solvent when a polycyanoethylene is used as a starting material to dissolve the sulfur formed.

As previously described following the examples, tetracyanoethylene is obtained by the reaction of sulfur monochloride on malononitrile. In general, tetracyanoethane results from the reduction of tetracyanoethylene. It is generally preferred to employ tetracyanoethylene in the reaction of this invention since this avoids prior manufacture and isolation of the tetracyanoethane. Actually, the presence of sulfur due to the reduction of hydrogen sulfide (as shown in Example III) is avoided, if a mercaptan, such as an alkyl or aryl mercaptan of up to 6 carbons, is first introduced into the solution containing tetracyanoethylene in a non-basic medium to produce tetracyanoethane, which is then reacted without isolation under basic conditions with hydrogen sulfide or an alkali metal sulfide.

The amino groups in the cyano-containing diaminothiophenes of this invention react with anhydrides or acid chlorides. For example, reaction of 2,5-diamino-3,4-dicyanothiophene with a ten molar excess of acetic anhydride under reflux conditions for a half hour gave an 85% yield of 2,5-bis(acetamino)-3,4-dicyanothiophene. In a similar fashion, the diaminothiophene was reacted with excess of benzoyl chloride in pyridine at room temperature to give an 82% yield of 2,5-bis(benzoylamino)-3,4-dicyanothiophene. Both of these amino derivatives were stable at temperatures of up to 300° C., had the desired carbon, hydrogen, nitrogen, and sulfur content and had infrared bands for NH, amide CO, and C=C groups.

The diaminocyanothiophenes of this invention are in general stable compounds, particularly under acidic to neutral conditions, for example, 2,5-diamino-3,4-dicyanothiophene is a relatively stable compound under non-basic conditions as evident from its sublimation temperature of about 240° C. However, hydrolysis of the dicyanothiophene results in the transformation of one of the cyano groups to a carboxylic group. In this manner, carboxylic ester and amides can also be obtained. The substituted thiophenes of this invention are useful as developers in photographic applications, and can be used in place of phenylenediamine as a developer. The new diaminothiophenes of this invention react with dibasic acids such as adipic or sebacic acids to produce new polymeric amides. The new thiophenes of this invention are also useful as rubber accelerators. They are chelating agents, for example, they react in solution with metals such as copper in copper acetate to remove the metal ions from solution.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A substituted thiophene represented by the formula

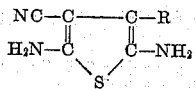

wherein R is a radical selected from the class consisting of cyano, phenyl, carbalkoxy of up to six carbon atoms, acyl of an alkanoic acid of up to six carbon atoms, and carbamyl.

2. A substituted thiophene represented by the formula:

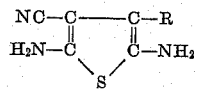

wherein R is carbalkoxy of up to six carbon atoms.

3. A substituted thiophene represented by the formula:

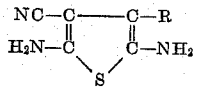

wherein R is acyl of an alkanoic acid of up to six carbon atoms.

4. 2,5-diamino-3,4-dicyanothiophene.
5. 2,5-diamino-3-cyano-4-phenylthiophene.
6. 2,5-diamino-3-cyano-4-carbethoxythiophene.
7. 2,5-diamino-3-cyano-4-carbamylthiophene.
8. 2,5-diamino-3-cyano-4-acetylthiophene.
9. Process for preparing substituted 2,5-diamino-3-cyanothiophenes which comprises bringing into contact and reacting, at a temperature of 0° to 60° C., a water-soluble inorganic sulfide with a polycyano compound in a solvent and in contact with a base having a pH in water of at least 8, said polycyano compound being selected from the class consisting of polycyanoethylenes having the formula $(NC)_2C=C(CN)R$ and polycyanoethanes of the formula $(NC)_2CHCH(CN)R$ wherein R is a radical selected from the class consisting of cyano, phenyl, carbalkoxy of up to six carbon atoms, acyl of an alkanoic acid of up to six carbon atoms, and carbamyl, and separating as the resulting product a substituted 2,5-diamino-3-cyanothiophene having the radical R attached to the carbon atom in the 4-position of the thiophene ring.

10. Process for preparing 2,5-diamino-3,4-dicyanothiophene which comprises bringing into contact and reacting, at a temperature of 0° to 60° C., an inorganic sulfide selected from the class consisting of hydrogen sulfide and alkali metal sulfides with tetracyanoethane in a solvent and in contact with a base having a pH in water of at least 8, and separating 2,5-diamino-3,4-dicyanothiophene as the resulting product.

11. Process for preparing 2,5-diamino-3,4-dicyanothiophene which comprises bringing into contact and reacting, at a temperature of 0° to 60° C., an inorganic sulfide selected from the class consisting of hydrogen sulfide and alkali metal sulfides with tetracyanoethylene in a solvent and in contact with a base having a pH in water of at least 8, and separating 2,5-diamino-3,4-dicyanothiophene as the resulting product.

12. Process for preparing 2,5-diamino-3,4-dicyanothiophene which comprises bringing into contact and reacting, at a temperature of 0° to 60° C., an alkali metal sulfide in aqueous solution having a pH of at least 8 with tetracyanoethane in acetone, and separating 2,5-diamino-3,4-dicyanothiophene as the resulting product.

13. Process for preparing 2,5-diamino-3,4-dicyanothiophene which comprises bringing into contact and reacting, at a temperature of 0° to 60° C., hydrogen sulfide with tetracyanoethane in acetone and in contact with a basic amine having a pH in water of at least 8, and separating 2,5-diamino-3,4-dicyanothiophene as the resulting product.

14. Process for preparing 2,5-diamino-3,4-dicyanothiophene which comprises bringing into contact and reacting, at a temperature of 0° to 60° C., hydrogen sulfide with tetracyanoethylene in acetone and in contact with a basic amine having a pH in water of at least 8, and separating 2,5-diamino-3,4-dicyanothiophene as the resulting product.

15. Process for preparing 2,5-diamino-3,4-dicyanothiophene which comprises bringing into contact and reacting, at a temperature of 0° to 60° C., hydrogen sulfide with tetracyanoethane in a basic amine solvent having a pH in water of at least 8, and separating 2,5-diamino-3,4-dicyanothiopene as the resulting product.

References Cited in the file of this patent

UNITED STATES PATENTS 2,562,988    McCleary _____ Aug. 7, 1951

OTHER REFERENCES

Linstead, C. A. 31: 6236[2] (2,3 dicyanothiophene).